United States Patent
Tiirola et al.

(10) Patent No.: US 12,273,863 B2
(45) Date of Patent: Apr. 8, 2025

(54) METHOD AND APPARATUS FOR RESOURCE ALLOCATION

(71) Applicant: Nokia Solutions and Networks Oy, Espoo (FI)

(72) Inventors: Esa Tiirola, Oulu (FI); Ilkka Keskitalo, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 612 days.

(21) Appl. No.: 17/271,253

(22) PCT Filed: Sep. 27, 2018

(86) PCT No.: PCT/EP2018/025253
§ 371 (c)(1),
(2) Date: Feb. 25, 2021

(87) PCT Pub. No.: WO2020/064076
PCT Pub. Date: Apr. 2, 2020

(65) Prior Publication Data
US 2021/0345322 A1    Nov. 4, 2021

(51) Int. Cl.
*H04W 72/04* (2023.01)
*H04W 72/0446* (2023.01)
*H04W 72/1263* (2023.01)

(52) U.S. Cl.
CPC ... *H04W 72/0446* (2013.01); *H04W 72/1263* (2013.01)

(58) Field of Classification Search
None
See application file for complete search history.

(56) References Cited

U.S. PATENT DOCUMENTS

| | | | |
|---|---|---|---|
| 2011/0149774 A1* | 6/2011 | Chen | H04L 1/1887 370/252 |
| 2012/0002591 A1* | 1/2012 | Noh | H04W 72/27 370/315 |
| 2012/0069795 A1* | 3/2012 | Chung | H04L 1/1861 370/315 |
| 2013/0143574 A1* | 6/2013 | Teyeb | H04W 36/0055 455/438 |

(Continued)

FOREIGN PATENT DOCUMENTS

| | | |
|---|---|---|
| WO | 2019/105564 A1 | 6/2019 |
| WO | 2019/141356 A1 | 7/2019 |
| WO | WO-2019208994 A1 * | 10/2019 |

OTHER PUBLICATIONS

Office Action received for corresponding European Patent Application No. 18785252.0, dated Apr. 18, 2023, 5 pages.

(Continued)

*Primary Examiner* — Kodzovi Acolatse
(74) *Attorney, Agent, or Firm* — ALSTON & BIRD LLP

(57) ABSTRACT

A method comprises receiving resource configuration from at least one of a parent node and donor node. The resource configuration comprises information defining at least one resource type for a plurality of links for at least one time and at least one resource. The method comprises allocating, in dependence on the resource configuration, the at least one resource for said at least one time to at least one link of the plurality of links, the at least one link being with one or more child nodes.

18 Claims, 11 Drawing Sheets

(56) References Cited

U.S. PATENT DOCUMENTS

| | | | | |
|---|---|---|---|---|
| 2014/0022982 | A1* | 1/2014 | Kim | H04L 1/0077 |
| | | | | 370/315 |
| 2014/0301371 | A1* | 10/2014 | Maeda | H04W 84/005 |
| | | | | 370/331 |
| 2017/0208574 | A1* | 7/2017 | Ramakrishna | H04L 5/0092 |
| 2020/0053680 | A1* | 2/2020 | Abedini | H04W 72/044 |
| 2020/0383073 | A1* | 12/2020 | Liu | H04J 3/0673 |
| 2021/0127389 | A1* | 4/2021 | Liu | H04L 5/0087 |
| 2021/0251011 | A1* | 8/2021 | You | H04W 74/0833 |
| 2021/0298088 | A1* | 9/2021 | Qi | H04W 74/0833 |

OTHER PUBLICATIONS

Office Action received for corresponding Indian Patent Application No. 202147018077, dated Feb. 9, 2022, 6 pages.

"3rd Generation Partnership Project; Technical Specification Group Radio Access Network; NR; Physical layer procedures for control (Release 15)", 3GPP TS 38.213, V15.2.0, Jun. 2018, pp. 1-99.

International Search Report and Written Opinion received for corresponding Patent Cooperation Treaty Application No. PCT/EP2018/025253, dated May 8, 2019, 14 pages.

"Dynamic Resource Allocation between Backhaul and Access Links", 3GPP TSG RAN WG1 Meeting #93, R1-1806662, Agenda : 7.7.3, Nokia, May 21-25, 2018, 6 pages.

"NR Frame Structure Design", 3GPP TSG RAN1 Meeting #87, R1-1612360, Agenda : 7.1.1, AT&T, Nov. 10-14, 2016, 4 pages.

"Motivation for Study on Integrated Access and Backhaul for NR", RAN#75, RP-17XXXX, Agenda : 9.1, AT&T, Mar. 6-9, 2017, 8 pages.

"Dynamic Resource Allocation for Integrated Access and Backhaul", 3GPP TSG RAN WG1#90, R1-1714497, Agenda : 6.2, Samsung, Aug. 21-25, 2017, 3 pages.

"3rd Generation Partnership Project; Technical Specification Group Radio Access Network;Access and Backhaul; (Release 15)", 3GPP TR 38.874, V0.5.0, Oct. 2018, pp. 1-81.

Office Action for Chinese Application No. 201880098040.0 dated Nov. 6, 2023, 14 pages.

Office Action for Chinese Application No. 201880098040.0 dated Apr. 19, 2024, 12 pages.

Office Action for Chinese Application No. 201880098040.0 dated Jun. 26, 2024, 9 pages.

* cited by examiner

| Parent BH | Type 1a | Type 1b | Type 2a | Type 2b | Type 3a | Type 3b |
|---|---|---|---|---|---|---|
| Child BH | CDL | | CUL | | F | |
| Child Access | | ADL | | AUL | | F |

| Parent BH | Type 1 | Type 2 | Type 3 |
|---|---|---|---|
| Child BH | CDL | CUL | F |
| Child Access | ADL | AUL | F |

Figure 9

| Parent BH | Type 4a | Type 4b | Type 5a | Type 5b |
|---|---|---|---|---|
| Child BH | PDL | PDL | PUL | PUL |
| Child Access | CUL | AUL | CDL | ADL |

| Parent BH | Type 4 | Type 5 |
|---|---|---|
| Child BH | PDL | PUL |
| Child Access | CUL | CDL |
| | AUL | ADL |

Figure 10

| | Type 6 | Type 7 | Type 8 | Type 9 |
|---|---|---|---|---|
| Parent BH | PDL | PUL | PDL | PUL |
| Child BH | CDL | CUL | F | F |
| Child Access | ADL | AUL | F | F |

| | Type 6a | Type 6b | Type 7a | Type 7b | Type 8a | Type 8b | Type 9a | Type 9b |
|---|---|---|---|---|---|---|---|---|
| Parent BH | PDL | PDL | PUL | PUL | PDL | PDL | PUL | PUL |
| Child BH | CDL | | CUL | | F | F | F | |
| Child Access | | ADL | | AUL | | | | F |

Figure 11

METHOD AND APPARATUS FOR RESOURCE ALLOCATION

FIELD

The present application relates to a method, apparatus and computer program and in particular but not exclusively to a method and apparatus for to be used in a network using integrated access and backhauling.

BACKGROUND

A communication system can be seen as a facility that enables communication sessions between two or more entities such as communication devices, base stations/access points/relay nodes and/or other nodes by providing carriers between the various entities involved in the communications path. A communication system can be provided for example by means of a communication network and one or more compatible communication devices.

In a wireless communication system at least a part of a communication session between at least two stations occurs over a wireless link.

A communication device is provided with an appropriate signal receiving and transmitting apparatus for enabling communications, for example enabling access to a communication network or communications directly with other communication devices. The communication device may access a carrier provided by a station or access point, and transmit and/or receive communications on the carrier.

The communication system and associated devices may operate in accordance with a given standard or specification which sets out what the various entities associated with the system are permitted to do and how that should be achieved. Communication protocols and/or parameters which shall be used for the connection are typically defined.

SUMMARY

According to an aspect, there is a provided a method comprising: receiving resource configuration from at least one of a parent node and donor node, said resource configuration comprising information defining at least one resource type for a plurality of links for at least one time and at least one resource; and allocating, in dependence on said resource configuration, said at least one resource for said at least one time to at least one link of said plurality of links, said at least one link being with one or more child nodes.

The method may comprise determining one or more schedulable resources for at least one link of the plurality of links for the at least one time and the at least one resource based on said received resource configuration, said allocating using said determined schedulable resources.

At least one resource may comprise at least one physical resource block.

At least one resource type may be flexibly allocatable to any one of a plurality of said links.

The plurality of links may comprise one or more of an uplink backhaul link with a first child node, a downlink backhaul link with said first child node, an uplink access link with a second child node and a downlink access link with a second child node.

At least one resource type may define for at least one time and at least one resource an access link with said second child node and a backhaul link with a first child node.

One or more of the following resource types may be defined by said information in said resource configuration: a first type for the downlink child access link with the second child node and the downlink backhaul link with the first child node; a second type for the uplink child access link with the second child node and the uplink backhaul link with the first child node; and a third, flexible, type which can be used for any the links with first and second child nodes.

The method may comprise dropping allocation of the at least one time and at least one resource to a link with said parent node or donor node and using said at least one time and at least one resource for at least one link with at least one child node.

In at least one resource type may be such that at least one time and at least one resource is not schedulable for a child link and is schedulable for a link with said parent node or donor node.

One or more of the following resource types may be defined by said information in said resource configuration: a first parent or donor node link type for the downlink backhaul link with the parent or donor node; a second parent or donor node link type for the uplink backhaul link with the parent or donor node; and a third, flexible, parent or donor node link type which can be used for any the links with the parent or donor node and the child nodes.

The method may comprise receiving further configuration information indicating that the third, flexible, parent or donor node link type resource is reserved for a link with said parent or donor node, determining that at least one time and at least one resource is not allocatable to any one of a plurality of said child links and allocating at least one time and at least one resource to said link with said parent or donor node.

The further configuration information comprises one or more of higher layer configuration and downlink control information.

At least one parent or donor node link may be time multiplexed with respect to at least one child link.

At least one parent or donor node link and at least one child link may be at least one of frequency division multiplexed and spatial division multiplexed with respect to one another.

The method may comprise receiving further configuration information indicating that the third, flexible, parent or donor node link type resource is reserved for a link with said parent or donor node and determining that at least one time and at least one resource is allocatable to downlink child links if said at least one time and at least one resource is reserved for uplink parent or donor node backhaul or determining that at least one time and at least one resource is allocatable to uplink child links if said at least one time and at least one resource is reserved for downlink parent or donor node backhaul.

The resource type may comprise one or more resource types for a plurality of links where at least one link is with the parent or donor node and at least one link is with a child node.

At least one link with the parent or donor node is one of uplink and downlink and at least one link with the child node is one of uplink and downlink.

One or more of the following resource types is defined by said information in said resource configuration: a fourth type for the uplink parent or donor node backhaul and one or more of a downlink child access link with a second child node and the downlink backhaul link with a first child node; and a fifth type for the uplink parent or donor node backhaul and one or more of uplink child access link with the second child node and the uplink backhaul link with the first child node.

One or more of the following resource types may be defined by said information in said resource configuration: a sixth type for the uplink parent or donor node backhaul and one or more of uplink child access link with a second child node and the uplink backhaul link with a first child node; a seventh type for the downlink parent or donor node backhaul and one or more of uplink child access link with the second child node and the uplink backhaul link with the first child node; a eighth type for the uplink parent or donor node backhaul and any of the links with the first and second child nodes; and a ninth type for the downlink parent or donor node backhaul and any of the links with the first and second child nodes.

At least one time may comprise a plurality of time slots, said resource type being one or more of slot specific and symbol specific.

The resource configuration may be provided by at least one of the following: cell-specific higher layer configuration; dedicated higher layer configuration; and group-common physical downlink control channel.

According to another aspect, there is provided a method comprising: causing resource configuration to be transmitted from a parent node or donor node, said resource configuration comprising information defining at least one resource type for a plurality of links for at least one time and at least one resource.

According to another aspect, there is a provided an apparatus comprising means for: receiving resource configuration from at least one of a parent node and donor node, said resource configuration comprising information defining at least one resource type for a plurality of links for at least one time and at least one resource; and allocating, in dependence on said resource configuration, said at least one resource for said at least one time to at least one link of said plurality of links, said at least one link being with one or more child nodes.

The means may be for determining one or more schedulable resources for at least one link of the plurality of links for the at least one time and the at least one resource based on said received resource configuration, said allocating using said determined schedulable resources.

At least one resource may comprise at least one physical resource block.

At least one resource type may be flexibly allocatable to any one of a plurality of said links.

The plurality of links may comprise one or more of an uplink backhaul link with a first child node, a downlink backhaul link with said first child node, an uplink access link with a second child node and a downlink access link with a second child node.

At least one resource type may define for at least one time and at least one resource an access link with said second child node and a backhaul link with a first child node.

One or more of the following resource types may be defined by said information in said resource configuration: a first type for the downlink child access link with the second child node and the downlink backhaul link with the first child node; a second type for the uplink child access link with the second child node and the uplink backhaul link with the first child node; and a third, flexible, type which can be used for any the links with first and second child nodes.

The means may be for dropping allocation of the at least one time and at least one resource to a link with said parent node or donor node and using said at least one time and at least one resource for at least one link with at least one child node.

In at least one resource type may be such that at least one time and at least one resource is not schedulable for a child link and is schedulable for a link with said parent node or donor node.

One or more of the following resource types may be defined by said information in said resource configuration: a first parent or donor node link type for the downlink backhaul link with the parent or donor node; a second parent or donor node link type for the uplink backhaul link with the parent or donor node; and a third, flexible, parent or donor node link type which can be used for any the links with the parent or donor node and the child nodes.

The means may be for receiving further configuration information indicating that the third, flexible, parent or donor node link type resource is reserved for a link with said parent or donor node, determining that at least one time and at least one resource is not allocatable to any one of a plurality of said child links and allocating at least one time and at least one resource to said link with said parent or donor node.

The further configuration information comprises one or more of higher layer configuration and downlink control information.

At least one parent or donor node link may be time multiplexed with respect to at least one child link.

At least one parent or donor node link and at least one child link may be at least one of frequency division multiplexed and spatial division multiplexed with respect to one another.

The means may be for receiving further configuration information indicating that the third, flexible, parent or donor node link type resource is reserved for a link with said parent or donor node and determining that at least one time and at least one resource is allocatable to downlink child links if said at least one time and at least one resource is reserved for uplink parent or donor node backhaul or determining that at least one time and at least one resource is allocatable to uplink child links if said at least one time and at least one resource is reserved for downlink parent or donor node backhaul.

The resource type may comprise one or more resource types for a plurality of links where at least one link is with the parent or donor node and at least one link is with a child node.

At least one link with the parent or donor node is one of uplink and downlink and at least one link with the child node is one of uplink and downlink.

One or more of the following resource types is defined by said information in said resource configuration: a fourth type for the uplink parent or donor node backhaul and one or more of a downlink child access link with a second child node and the downlink backhaul link with a first child node; and a fifth type for the uplink parent or donor node backhaul and one or more of uplink child access link with the second child node and the uplink backhaul link with the first child node.

One or more of the following resource types may be defined by said information in said resource configuration: a sixth type for the uplink parent or donor node backhaul and one or more of uplink child access link with a second child node and the uplink backhaul link with a first child node; a seventh type for the downlink parent or donor node backhaul and one or more of uplink child access link with the second child node and the uplink backhaul link with the first child node; a eighth type for the uplink parent or donor node backhaul and any of the links with the first and second child nodes; and a ninth type for the downlink parent or donor node backhaul and any of the links with the first and second child nodes.

At least one time may comprise a plurality of time slots, said resource type being one or more of slot specific and symbol specific.

The resource configuration may be provided by at least one of the following: cell-specific higher layer configuration; dedicated higher layer configuration; and group-common physical downlink control channel.

According to another aspect, there is provided an apparatus comprising: means for causing resource configuration to be transmitted from a parent node or donor node, said resource configuration comprising information defining at least one resource type for a plurality of links for at least one time and at least one resource.

According to an aspect, there is provided an apparatus comprising at least one processor and at least one memory including computer code for one or more programs, the at least one memory and the computer code configured, with the at least one processor, to cause the apparatus at least to: receive resource configuration from at least one of a parent node and donor node, said resource configuration comprising information defining at least one resource type for a plurality of links for at least one time and at least one resource; and allocate in dependence on said resource configuration, said at least one resource for said at least one time to at least one link of said plurality of links, said at least one link being with one or more child nodes.

The at least one memory and the computer code may be configured, with the at least one processor, to cause the apparatus at least to determine one or more schedulable resources for at least one link of the plurality of links for the at least one time and the at least one resource based on said received resource configuration, said allocating using said determined schedulable resources.

At least one resource may comprise at least one physical resource block.

At least one resource type may be flexibly allocatable to any one of a plurality of said links.

The plurality of links may comprise one or more of an uplink backhaul link with a first child node, a downlink backhaul link with said first child node, an uplink access link with a second child node and a downlink access link with a second child node.

At least one resource type may define for at least one time and at least one resource an access link with said second child node and a backhaul link with a first child node.

One or more of the following resource types may be defined by said information in said resource configuration: a first type for the downlink child access link with the second child node and the downlink backhaul link with the first child node; a second type for the uplink child access link with the second child node and the uplink backhaul link with the first child node; and a third, flexible, type which can be used for any the links with first and second child nodes.

The at least one memory and the computer code may be configured, with the at least one processor, to cause the apparatus at least to drop allocation of the at least one time and at least one resource to a link with said parent node or donor node and using said at least one time and at least one resource for at least one link with at least one child node.

In at least one resource type may be such that at least one time and at least one resource is not schedulable for a child link and is schedulable for a link with said parent node or donor node.

One or more of the following resource types may be defined by said information in said resource configuration: a first parent or donor node link type for the downlink backhaul link with the parent or donor node; a second parent or donor node link type for the uplink backhaul link with the parent or donor node; and a third, flexible, parent or donor node link type which can be used for any the links with the parent or donor node and the child nodes.

The at least one memory and the computer code may be configured, with the at least one processor, to cause the apparatus at least to receive further configuration information indicating that the third, flexible, parent or donor node link type resource is reserved for a link with said parent or donor node, determine that at least one time and at least one resource is not allocatable to any one of a plurality of said child links and allocate at least one time and at least one resource to said link with said parent or donor node.

The further configuration information comprises one or more of higher layer configuration and downlink control information.

At least one parent or donor node link may be time multiplexed with respect to at least one child link.

At least one parent or donor node link and at least one child link may be at least one of frequency division multiplexed and spatial division multiplexed with respect to one another.

The at least one memory and the computer code may be configured, with the at least one processor, to cause the apparatus at least to receive further configuration information indicating that the third, flexible, parent or donor node link type resource is reserved for a link with said parent or donor node and determine that at least one time and at least one resource is allocatable to downlink child links if said at least one time and at least one resource is reserved for uplink parent or donor node backhaul or determine that at least one time and at least one resource is allocatable to uplink child links if said at least one time and at least one resource is reserved for downlink parent or donor node backhaul.

The resource type may comprise one or more resource types for a plurality of links where at least one link is with the parent or donor node and at least one link is with a child node.

At least one link with the parent or donor node is one of uplink and downlink and at least one link with the child node is one of uplink and downlink.

One or more of the following resource types is defined by said information in said resource configuration: a fourth type for the uplink parent or donor node backhaul and one or more of a downlink child access link with a second child node and the downlink backhaul link with a first child node; and a fifth type for the uplink parent or donor node backhaul and one or more of uplink child access link with the second child node and the uplink backhaul link with the first child node.

One or more of the following resource types may be defined by said information in said resource configuration: a sixth type for the uplink parent or donor node backhaul and one or more of uplink child access link with a second child node and the uplink backhaul link with a first child node; a seventh type for the downlink parent or donor node backhaul and one or more of uplink child access link with the second child node and the uplink backhaul link with the first child node; a eighth type for the uplink parent or donor node backhaul and any of the links with the first and second child nodes; and a ninth type for the downlink parent or donor node backhaul and any of the links with the first and second child nodes.

At least one time may comprise a plurality of time slots, said resource type being one or more of slot specific and symbol specific.

The resource configuration may be provided by at least one of the following: cell-specific higher layer configuration; dedicated higher layer configuration; and group-common physical downlink control channel.

According to an aspect, there is provided an apparatus comprising at least one processor and at least one memory including computer code for one or more programs, the at least one memory and the computer code configured, with the at least one processor, to cause the apparatus at least to: cause resource configuration to be transmitted from a parent node or donor node, said resource configuration comprising information defining at least one resource type for a plurality of links for at least one time and at least one resource In another aspect there is provided a computer program embodied on a non-transitory computer-readable storage medium, the computer program comprising program code for providing any of the above methods.

In another aspect there is provided a computer program product for a computer, comprising software code portions for performing the steps of any of the previous methods, when said product is run.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

DESCRIPTION OF FIGURES

Some embodiments will now be described, by way of example only, with reference to the accompanying Figures in which:

FIG. 9 shows resource type combinations for a time division multiplexing scenario;

FIG. 10 shows resource type combinations for a frequency division/spatial division multiplexing scenario;

FIG. 11 shows resource type combinations for full duplex scenario; and

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
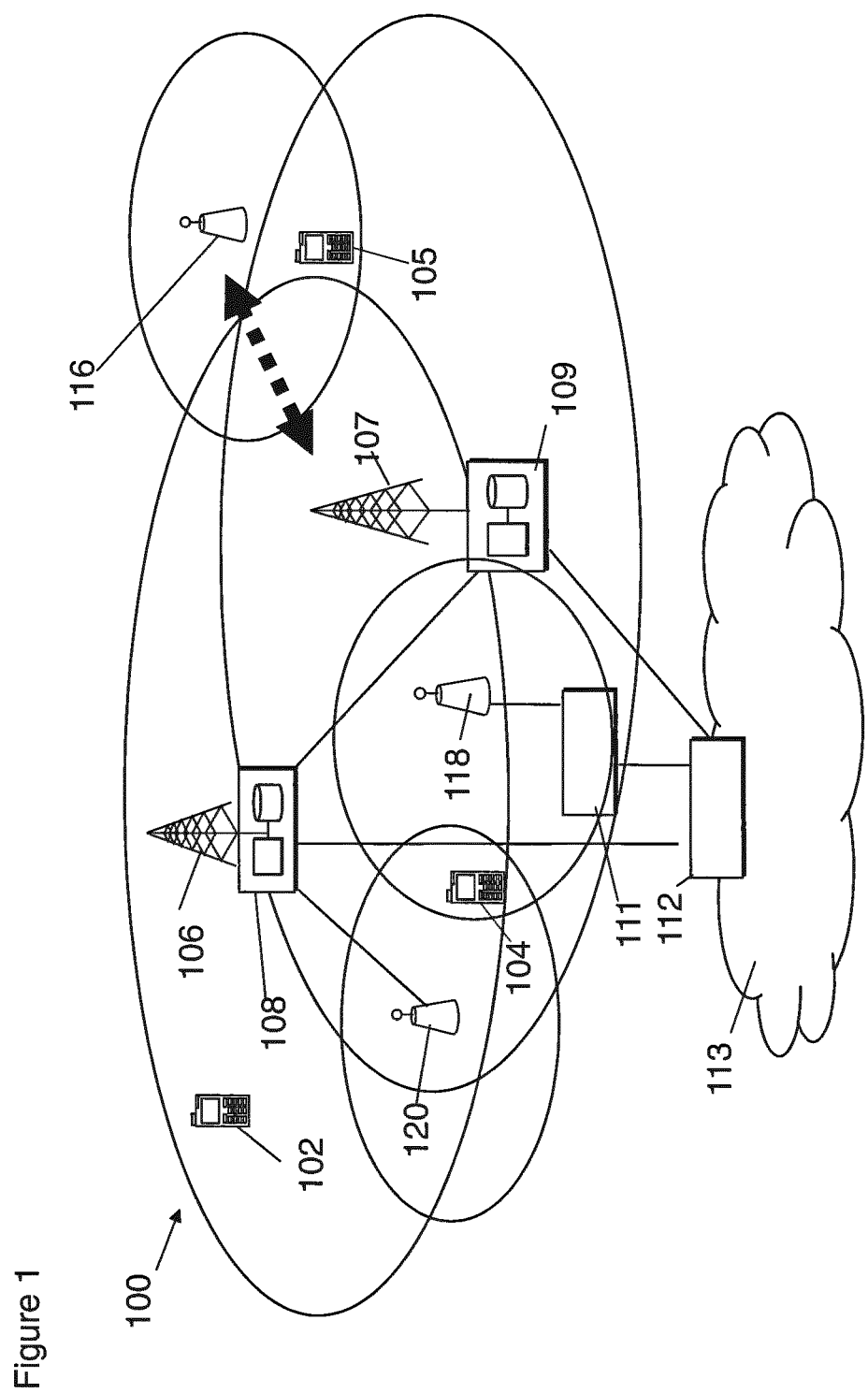
FIG. 1 shows a schematic diagram of an example communication system comprising a plurality of base stations and a plurality of communication devices.

In a wireless communication system 100, such as that shown in FIG. 1, mobile communication devices or user equipment (UE) 102, 104, 105 are provided wireless access via at least one access point or similar wireless transmitting and/or receiving node or point. An access point or base station is referred to as a Node B or generally NB (for example an eNB in LTE and gNB in 5G NR). Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations (or relay nodes or RN) 116, 118 and 120 may also be connected to the network 113, for example by a separate gateway function and/or via the controllers of the macro level stations. The relay nodes may be considered to contain some communication device functionality which facilitates backhaul connection between a donor gNB (DgNB) or a serving relay node in the case of a multi-hop scenario. This communication device functionality may limited to those functions handling the radio link. That functionality may be referred to as a mobile termination MT function. Furthermore the relay node may be considered to contain gNB functionality which facilitates access link connection between communication devices within the relay node cell as well as the backhaul connection for relay nodes served by the current relay node (when the relay node is operating as a serving relay node in a multi-hop scenario).

An example of wireless communication systems are architectures standardized by the 3rd Generation Partnership Project (3GPP). One is often referred to as the 5G NR (new radio) standards. It should be appreciated that whilst some embodiments maybe described in the context of the 5G standards, other embodiments may be used in the context of any other suitable standard.

The 5G NR network may be able to allow network deployment with a relatively low manual effort and a relatively high automated self-configuration. In some situations coverage may be problematic. This may be an issue, for example, on higher frequency bands. In some embodiments, the system may be such that coverage extensions may be provided. In some embodiments, these coverage extensions may be provided with little or no network (re-)planning. In some embodiments, this may be achieved in a relatively fast and/or cost-effective manner.

In the current 5G proposals, capabilities are being specified which enable wireless backhauling for access point sites that do not have a fixed (for example wired and/or fibre) connection to the network. Using a radio connection for backhauling may eliminate the need for cabling of at least some or even all access point sites of the radio network (which can be very dense). This may reduce the initial deployment costs.

It has been proposed that the same carrier be used for both backhaul BH (a.k.a. parent BH links) and access links (a.k.a. child links) sharing the same radio resources and radio transceivers. This is called self-backhauling. In 3GPP, this is sometimes referred to as integrated access and backhauling (IAB). Frequency bands which may be applicable for IAB are those having sufficient capacity, i.e. large enough carrier bandwidths. Those carriers may be on mm wave bands and are typically TDD (time division duplex) bands. When using TDD bands, the IAB needs to take into account the half-duplex constraint, that is no simultaneous transmission and reception. This is to avoid too much interference between a transmitter and a receiver. There may be two half-duplex scenarios: 1) half-duplex with TDM between access and BH and 2) half-duplex with FDM/SDM between access and backhaul. Depending on the capabilities of the IAB node, a full-duplex approach may be supported alternatively or additionally.

IAB or self-backhauling may need to support multi-hop relaying. In some embodiments, the IAB may support the use of one or more relay nodes. Multi-hop relaying may be where an IAB node may provide a wireless BH link for the next hop IAB node. The serving node providing the BH connection is called a parent node where the node can be either a donor node (with wired network connection), or another IAB node. The served IAB node is called a child node.

Different options for an IAB architecture have been proposed.

Figure 5:
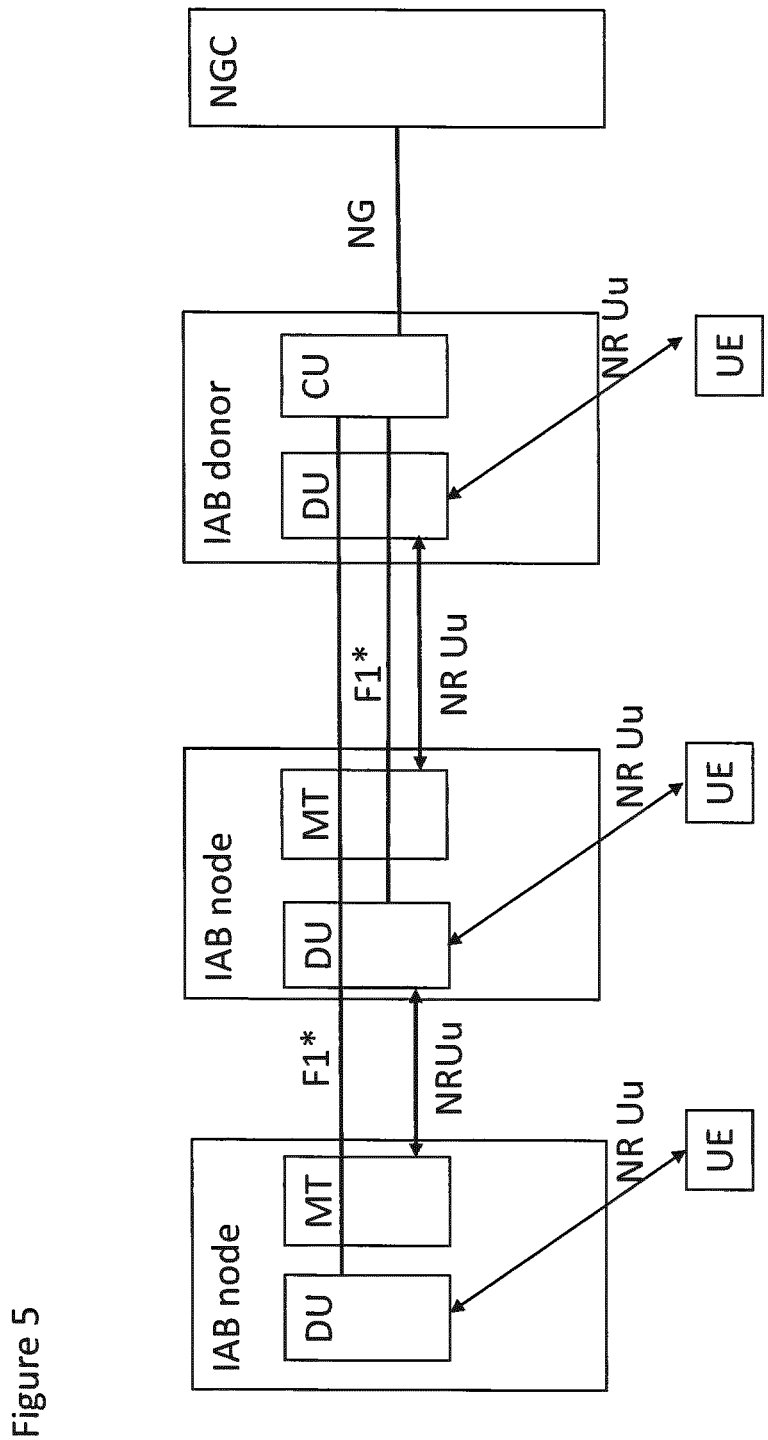
FIG. 5 shows a first example of an integrated access and backhaul (IAB) architecture.

In this regard, reference is made to FIG. 5 which shows a high level architecture for L2 relaying with a distributed base station, i.e. gNB, architecture. The donor node (IAB donor) hosts the centralized unit (CU) for all IAB nodes i.e. it runs RRC (radio resource control), higher L2 (PDCP—packet data convergence protocol) and control functions for the subtending IAB topology. Distributed units (DUs) reside at the IAB nodes hosting the lower L2 protocol layers (RLC radio link control, MAC medium access control) and physical (PHY) layer. With this architecture the radio resources usage can be coordinated centrally by the CU of the IAB donor. Each IAB node has the MT function discussed previously.

NGC is the 5G (next generation) core to which the RAN nodes are connected via the NG interface. The F1 is the interface between CU and DU. F1 is the standardized interface for a wired CU-DU interface whereas F1* may include some IAB specific enhancements due to the wireless connection.

Figure 6:
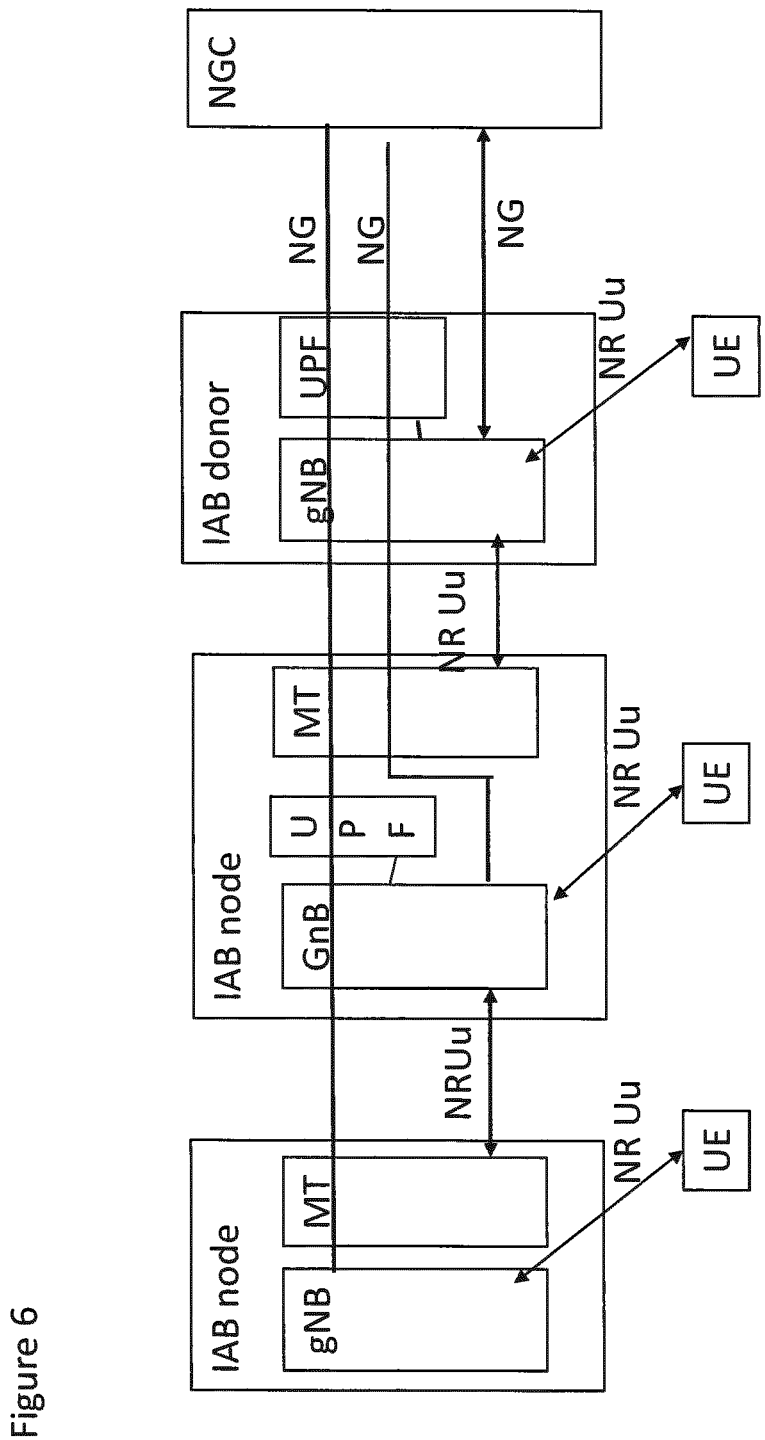
FIG. 6 shows a second example of an integrated access and backhaul architecture.

Another IAB architecture option using a connectivity service for the BH is shown in FIG. 6. In this case, IAB nodes including the donor IAB node host a whole gNB functionality with a full protocol stack including RRC (radio resource control). The IAB nodes host the MT function. In this case the radio resource coordination may be distributed or the donor may act as a central coordinator for the IAB nodes. In FIG. 6 the UPF (User Plane Function) is the gateway functionality which is a CN function but can be included in the IAB nodes to establish a PDU (protocol data unit) session between the serving node and the served node MT to carry backhaul data. This is an alternative architecture to implement IAB operation. A bearer is provided between the MT of one node with the gNB or another node.

The gNB function may be split between an IAB-donor and an IAB node using a split for a centralized unit (CU) and a distributed unit (DU). In this case the backhaul connection carries also the gNB internal interface. It should be appreciated that some embodiments may be used with any of these architectures or any other suitable architecture.

In the following a higher hop may be understood to be the communications from an apparatus and a further apparatus towards the donor access node, for example a communications hop between a relay node and a donor access node, and a lower hop may be understood to be the communications from an apparatus and a further apparatus towards the user equipment, for example a communications hop between a relay node acting as a serving relay node and a further relay node.

The base stations 116, 118 and 120 may be pico or femto level base stations or the like. In the example, station 118 is connected via a gateway 111 whilst station 120 connects via the controller apparatus 108. The station 116 may be connected via station 107 as will be explained in further detail hereafter. In some embodiments, the smaller stations may not be provided.

In some embodiments, frequency bands of the order of millimetre waves may be used. Alternatively or additionally, lower frequency bands may be supported.

In some embodiments, a radio frequency beamforming architecture may be used at one or both of the gNB/IAB node and communications device.

Some embodiments may be primarily use TDD. Alternatively or additionally, an FDD scenario may be supported.

In some embodiments, self-backhaul may be primarily used. However in some embodiments, out-band relay may be supported as well.

Figure 2:
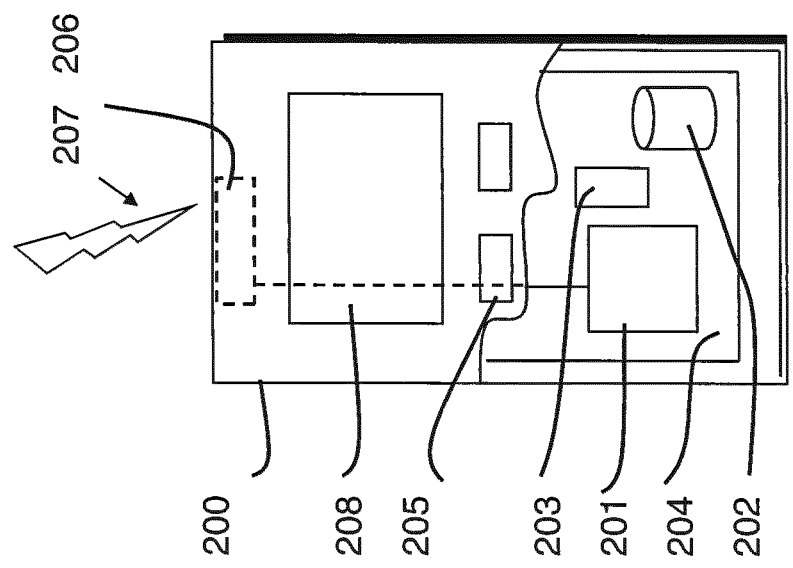
FIG. 2 shows a schematic diagram of an example mobile communication device.

A possible communication device will now be described in more detail with reference to FIG. 2 showing a schematic, partially sectioned view of a communication device 200. Such a communication device is often referred to as user equipment (UE) or terminal. An appropriate communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine type devices or any combinations of these or the like.

The communication device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A communication device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

A user may control the operation of the device by means of a suitable user interface such as key pad 205, voice commands, touch sensitive screen or pad, combinations thereof or the like. This may be optional in some embodiments.

A display 208, a speaker and a microphone can be also provided. Again this may be optional.

The communication devices 102, 104, 105 may access the communication system based on various access techniques. In some embodiments the relaying operation may be transparent to the UE.

Figure 3:
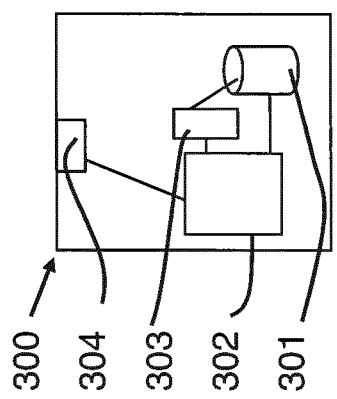
FIG. 3 shows a schematic diagram of an example control apparatus.

An example control apparatus is shown in FIG. 3. FIG. 3 shows an example of a control apparatus provided in a base station, an IAB node, or access point or relay node. The control apparatus 300 comprises at least one memory 301, at least one data processing unit 302, 303 and an input/output interface 304. Via the interface the control apparatus can be coupled to a receiver and a transmitter. The receiver and/or the transmitter may be implemented as a radio front end or a remote radio head. For example the control apparatus 300 or processor 302/303 can be configured to execute an appropriate software code to provide the control functions.

One of the aspects of 5G New Radio (NR) is the physical layer design and related NR functionalities for enhanced mobile broadband (eMBB) and ultra-reliable low-latency-communication (URLLC). The NR under this work item (NR Phase I) should consider frequency ranges up to 52.6 GHz. It is expected that NR work continues after Phase I with various enhancements, including also frequency ranges larger or smaller than 52.6 GHz. The 5G NR should be able to allow network deployment with minimized manual efforts and as automated self-configuration as possible. Especially on higher frequency bands the coverage may be an issue and specific capabilities are needed for NR to enable easy coverage extension with minimized/none requirements for network (re-)planning in a fast and cost-effective manner.

NR thus (and mainly for these reasons) has the requirement to support self-backhauling where the same carrier is used for the backhaul connection and the access links which enables in-band backhaul operation. A specific relaying node can be used to provide wireless backhaul connection (instead of having a wired connection) to a base station with fixed connection to the network backhaul. The serving base station(s) (or depending on the IAB architecture, other network node controlling the resource usage) then may have the overall control of the usage of the radio resources considering both access and backhaul links.

The considered self-backhauling scenarios include both frequency division duplex (FDD) and time division duplex (TDD). TDD operates on unpaired spectrum. A typical assumption for relay operation is that the IAB node cannot transmit and receive at the same time at least towards the same direction. This is called the half-duplex constraint.

Figure 4:
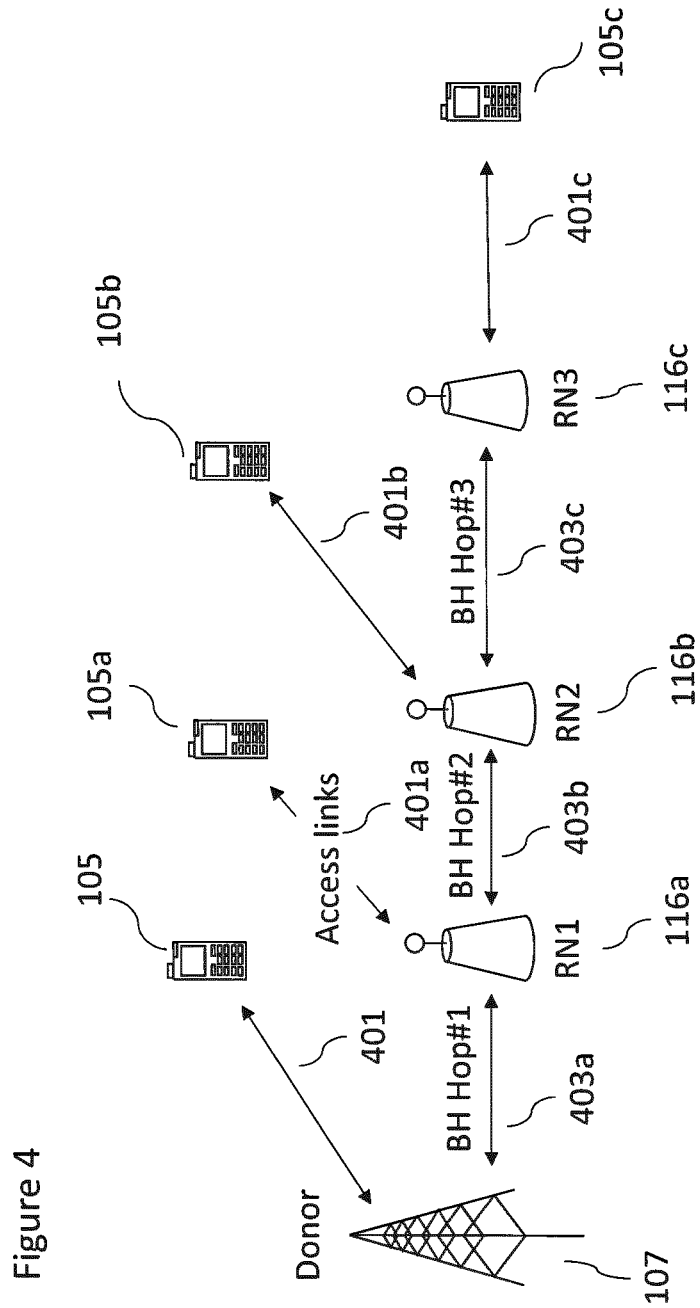
FIG. 4 shows example backhaul link configurations.

Reference is made to FIG. 4 which shows an example of a 3 hop scenario The example shows a gNB (or donor gNB or donor or IAB donor) 107, a first relay node (RN) 116a, a second relay node (RN) 116b, a third relay node (RN) 116c, a first communication device 105, a second communication device 105a, a third communication device 105b, and a fourth communication device 105c. In this scenario there are access links between a node and communication device, which may for example be a first uplink/downlink access link 401 between the gNB 107 and the first communication device 105, a second uplink/downlink access link 401a between the first RN 116a and the second communication device 105a, a third uplink/downlink access link 401b between the second RN 116b and the third communication device 105b, and a third uplink/downlink access link 401c between the third RN 116c and the fourth communication device 105d. FIG. 4 shows the backhaul links or links between access points/relay nodes. For example, there is shown in FIG. 4 a first hop backhaul link (BH Hop #1) 403a between the first RN 116a and gNB 107, a second hop backhaul link (BH Hop #2) 403b between the second RN 116b and first RN 116a and a third hop backhaul link (BH Hop #3) 403c between the third RN 116c and second RN 116b.

It should be appreciated that in other embodiments, there may be more or less than the number of hops shown in FIG. 4.

Some embodiments may be concerned with the resource allocation on the BH and/or access connection. Some embodiments may take into account multi-hop relaying in an IAB deployment. Some embodiments may provide robust operation while providing flexibility to adapt the capacity needs on both BH and access links.

Figure 7:
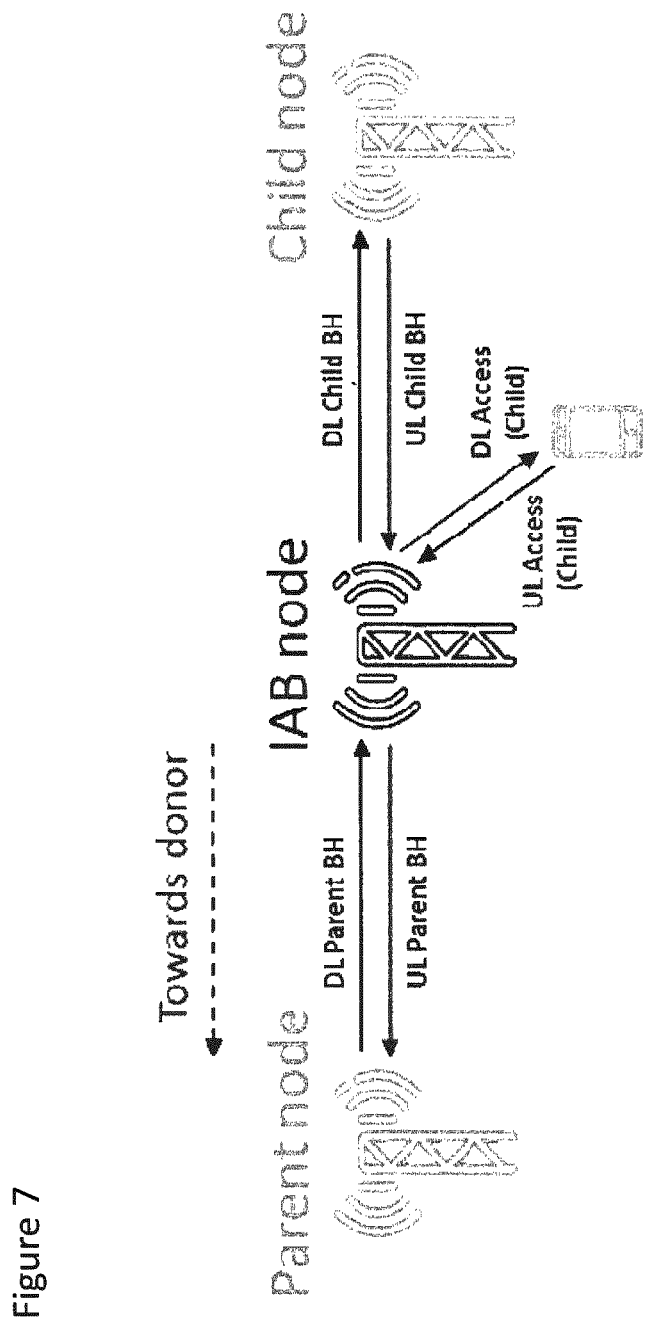
FIG. 7 shows links between an IAB nodes and communication devices.

FIG. 7 shows basic connections between the IAB nodes and access UEs. There is an IAB node which has a child node and a parent or donor node. The IAB node has an uplink UL parent BH and a downlink DL parent BH with the parent or donor node. The IAB node has an UL access link and a DL access link with a communication device which may be regard as being a child device. The IAB node has DL child BH and an UL child BH with the child node. The child node is thus two hops from the donor or parent node.

Some embodiments may address the problem as to how to configure and control the usage of each of the links. Some embodiments may configure and control the usage of the links in such a in a way that there will be no ambiguity at the IAB node as to whether DL/UL (downlink/uplink) scheduling at an IAB child link is supported at a given time instant and at a given resource (such as physical resource block).

In some embodiments, the allocation may provide a flexibility to allocate capacity. For example, the allocation may be on a need basis when the traffic load varies on one or more of the access and BH connections.

Some embodiments may facilitate interference management between the nodes. For example, link direction alignment between nodes may be supported.

Some embodiments may use half-duplex operation with one or more time domain multiplexing (TDM), frequency domain multiplexing (FDM) and spatial domain multiplexing (SDM). In some embodiments half-duplex operation with TDM is used in conjunction with one or more of FDM and SDM. This may provide a good resource utilization.

Some embodiments may use full duplex operation of the IAB nodes.

Some embodiments may be such that they can be used with legacy communication devices configured to operate with legacy standards.

It should be noted that in other embodiments, one or more changes may be made to a communication device in order to allow the communication device to operate in accord with some embodiments.

Some embodiments may define schedulable resources for an IAB child link. In some embodiments, a pre-defined resource type combination is defined. The combination may be between a parent link and a child link. This may be defined according to an IAB duplexing scheme. The duplexing scheme may be one or more of a TDM half-duplex scheme, a FDM/SDM half-duplex scheme, a full duplex and/or any other suitable scheme. Rules, for example priority rules may be defined for different links.

Figure 8:
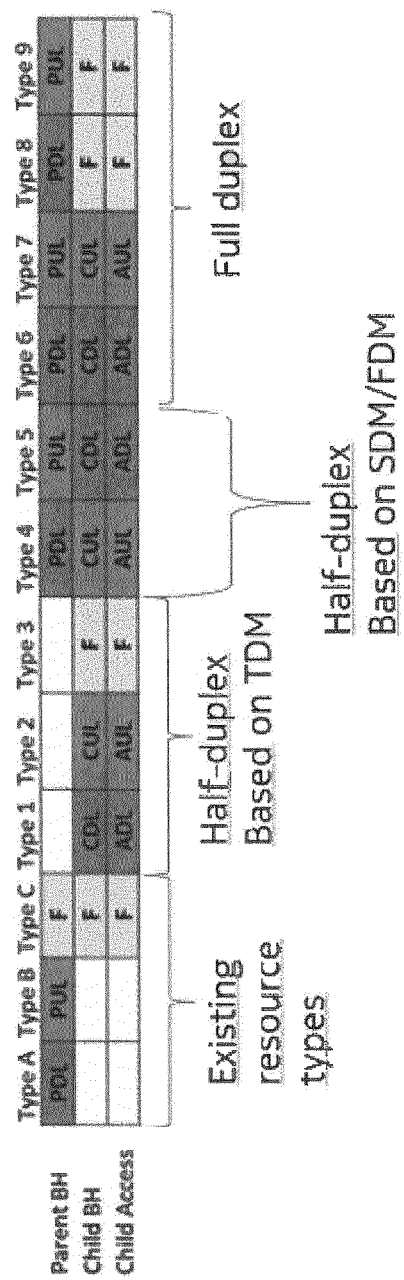
FIG. 8 shows a first example of resource type combinations for an IAB node.

FIG. 8 shows a table with one example of resource type combinations for an IAB node. An IAB node is the middle node of FIG. 7 that is a node with a parent and a child. The child may be a communications device or another relay node. A child link means the following links shown in FIG. 7: DL child BH, UL child BH, DL access (child), UL access (child).

It should be appreciated that one or more additional resource type combinations may be provided in other embodiments. Alternatively or additionally, one or more resource type combinations may be omitted.

Each column of the table shows one resource type combination for IAB node. Based on that, IAB node can determine which resources/resource types are available for the child link scheduling (that is under IAB node's responsibility). A blank entry indicates that the resource type does not have activity in the corresponding link (at a certain time, at a certain PRB physical resource block.)

Different types support different IAB capabilities and different interference scenarios. To this end, some embodiments provide a number of different combinations. Different resource types may be allocated to different time domain resources (such as slots/symbols).

An IAB node may utilize this information as boundary conditions to schedule IAB child links (that is under IAB node's responsibility).

Some embodiments may keep the overall control as well as interference management at the upper hierarchy node (parent node or IAB donor). However, some embodiments provide sufficient flexibility for the IAB node to perform scheduling.

The resource type combination is thus used to determine the schedulable resources for the IAB Child link. The IAB node, will used the resource type combination to define how to perform the actual scheduling. An IAB node may receive the resource type combination from RRC or lower layer control via one or more of the following:
  cell-specific higher layer signalling;
  dedicated higher layer signalling; and
  group-common PDCCH (physical downlink control channel) indicating the slot format indexes for one or more slots. This may be using DCI (downlink control information) format 2_0 or any other suitable format. IAB node may receive multiple resource configurations for a certain resource. Different signalling options may have predefined priorities and rules for managing the conflicting situations. For example, dedicated higher layer signalling may be able to override flexible resources of the cell-specific higher layer signalling. Dynamic DL control signalling such as GC-PDCCH (DCI 2_0) or dedicated DCI may be able to override flexible resources of the cell-specific higher layer signalling or dedicated higher layer signalling. Dedicated DCI may be able to override resource configuration defined by other signalling types.

The higher layer (semi-static) coordination scheme may depend on one or more of the architecture and protocol choices:
  L2 architecture may operate according to centralized coordination. In the case of centralized coordination, an IAB-donor may configure the resource usage for multiple hops.
  L3 architecture may operate according to a distributed coordination where the parent IAB node is responsible for the semi-static coordination. There can be information exchange between IAB nodes to enhance the resource utilization and control considering the resource allocation in the neighboring nodes.

The parent IAB node may be responsible for DL/UL scheduling for the parent BH link. The parent IAB node may be responsible for the dynamic resource coordination between parent BH and child links.

In the example shown in FIG. 8, the table shows types A to C and types 1 to 9. For each type, the table shows the operation of the parent BH link, the child BH link and the child access link.

A resource type combination may be determined in a slot-specific or symbol specific manner.

Types A to C are currently proposed resource types. Some embodiments may provide that the IAB node applies additional or alternative rules as to how to operate with these resource types.

Types A, B and C may be as for example proposed in NR Rel-15. Type A means the IAB node will use the particular resource for the parent downlink PDL backhaul, type B means the IAB node will use the particular resource for the parent uplink PUL and type C which is F (flexible) means the IAB node will use the particular resource for the parent BH, the child BH and/or the child access link. In NR Rel-15 signalling indicates if a resource is D (PDL) and U (PUL) or F (flexible) which indicates resources potentially available for IAB DL child link.

Resource types A and B determine resources which are exclusive for the parent BH link(s). For these resource types the parent BH link has the priority. An IAB node may not schedule any signal in IAB Child link(s), which results in transmission or reception at the IAB node's child link, when operating according to these resource types. These resources are meant for IAB operation under a TDM half-duplex constraint. When IAB node is serving the parent BH, it cannot serve child links.

Type A and Type B do not support simultaneous operation for Child and BH links.

A parent node can indicate D/F/U in signalling. Link direction alignment between parent and child IAB node may not be supported with resource types A to C alone. The parent node may indicate just D/F/U and in some situations some additional signalling/resource types is needed. One example of link direction alignment issues for existing proposals is that when a parent node serves its access link communications devices in DL (but has no DL parent BH), the parent node cannot configure IAB resource usage in such way that the IAB node would use flexible resources only for DL traffic. (The DL in the parent node's access link and UL in IAB node's access link may suffer from cross-link interference). It should be noted that in some embodiments link direction alignment may be supported When operating according to resource types A-C only, cell common signals at an IAB cell operate in flexible resources. When following NR Rel-15 rules defined for flexible resources, an IAB node can have SSB (synchronization signal blocks), PRACH (physical random access channel) and CORSET #0 (control resource set) for that IAB cell only if no periodic signals have been configured for PDL and PUL. The parent node may block SSB/PRACH/CORESET #0 by DCI.

Based on Rel-15 rules, flexible resources have coupling between the IAB parent link and IAB child link. The rules need to be taken into account for example when configuring periodic signals and PDCCH (physical downlink control channel) monitoring. This may be at both the parent and child nodes. It should be appreciated that the current rules do not consider different duplexing scenarios.

Slot configuration (based on resource types A to C) may be used to determine schedulable resources for IAB nodes at least in the case of TDM between parent BH and child links. This may be used as a starting point also for IAB node scenario. In some embodiments the signalling principles such layered structure (with TDD-UL-DL-Configuration-Common, TDD-UL-DL-ConfigurationDedicated, DCI format 2_0), adaptation periods, granularities etc may be used.

Some embodiments may use signalling principles used for NR Rel-15 slot format indication (layered structure, adaptation periods, granularities, etc.) also for the IAB scenario. In other embodiments, these signalling principles may not be used.

The current approach has not been designed for an IAB node scenario and there are some issues that may need to be addressed. For example Rel-15 signalling does not support link direction alignment (or other interference coordination) between different links. This means that additional signalling on top of NR Rel-15 would be required. Slot configuration based on Rel-15 contains coupling between parent BH and child links. According to Rel-15 rules, the parent BH link may always have the highest priority. The parent node may suffer from scheduler restrictions (e.g. to ensure that periodic signals and PDCCH monitoring occasions for IAB node are outside the flexible resources). An IAB node may have difficulties to configure resources for cell common signals SSB, PRACH and CORESET #0 (In some embodiment, these are provided within the flexible resources). Dynamic capacity allocation between access and BH may worsen the situation. Some embodiments may address this.

Some embodiments may address the need to have a common framework to cover different duplexing schemes (TDM/FDM/SDM, full duplex). It should be appreciated, that in other embodiments, the framework may only cover one or some of the different duplexing schemes discussed.

Type C may be considered as a default resource type combination for an IAB node and means the IAB node will use the particular resource flexibly. A flexible F resource type may be used to facilitate a dynamic BH/Access capacity allocation. Type C may be flexible between parent DL BH, parent UL BH, and IAB Child link(s). For flexible resources, the parent BH link may have priority over IAB child link(s).

Rules defined for flexible resources may be used as the basis for determining whether an IAB has a valid resource allocation for a parent BH link or not. In some embodiments, the rules may be based on the rules defined in TS 38.213. For example the rules may define that flexible symbols may be used as schedulable resources for IAB child links, provided that one or more of the following apply:

DCI 2_0 (if configured/detected) does not indicate that flexible symbols are used as DL or UL (i.e. for parent BH links);

the IAB node has not received an indication (DCI or higher layer configuration) to receive PDCCH, PDSCH (physical downlink shared channel) or CSI-RS (channel state information reference signal) (in the DL parent BH link) during flexible symbols; and the IAB node has not received an indication (DCI or higher layer configuration) to transmit PUSCH (physical uplink shared channel), PUCCH (physical uplink control channel), PRACH (physical random access channel) or SRS (sounding reference signal) (in the UL parent BH link) during flexible symbols.

In the case of half-duplex based on TDM between access and BH links, if an IAB node has a valid resource allocation or PDCCH monitoring occasion for a parent BH link based on a second configuration (DCI and/or higher layer signalling) it will define that the Type C resource is not available for IAB child link. If not, the Type C resource is available for an IAB Child link. (First resource configuration may contain one or more of the following: default configuration (all resources are flexible); cell-specific higher layer configuration; and dedicated higher layer configuration).

In the case of half-duplex based on SDM or FDM between access and BH links, if the IAB node has a valid resource allocation or PDCCH monitoring occasion for the parent DL BH link based on a second configuration (DCI and/or higher layer signalling) it will define that resource as a flexible resource available for an IAB child UL. If the IAB node has a valid resource allocation for a parent UL BH link based on a second configuration (DCI and/or higher layer signalling) it will define that resource as a flexible resource available for IAB child DL.

In the case of full duplex based on SDM/FDM between access and BH links, for Type C resources, an IAB node has full freedom in selecting resources for an IAB child link. A parent node may use dynamic signalling (such as DCI 2_0) to change Type C resources to other resource types (e.g. any of Type A, B, Type 1-9). This may require that slot format types corresponding to one or more (but not necessarily all) of Type 1-9 are defined. Flexible resources (based on first configuration) can be overridden by DCI indicated by DCI 2_0 (dynamic DCI).

A parent node may use dynamic signalling (such as DCI 2_0) to adapt Type C resources in dynamic manner to other resource types (e.g. Type A, B, Type 1-9). This may facilitate dynamic capacity adaptation between parent BH and child links(s) but it may require that slot format types are defined (one or more of reserved slot format indications SFI 56-254 may be used for this).

Types 1 to 3 are half duplex resources based on TDM.

In some embodiments, resource types 1-3 may be regarded as exclusive resources for an IAB child based on TDM between access and BH links.

In some embodiments, resource types A and B may have priority over resource types 1-3. For example, if certain resource is configured as resource type A or B, the IAB node may ignore DCI 2_0 trying to configure those resources for type 1-3.

In some embodiments, resource types 1-3 may have priority over flexible resources (Type C). When the IAB node has determined schedulable resources for the IAB child link for at least one time instant and at least one PRB (physical resource block), the IAB node will ignore (or drop) all UL/DL resource allocations and PDCCH monitoring occasions corresponding to the parent BH link and the at least one time instant.

In some embodiments, common channels for the IAB child link (such as SSB, CORESET #0 and PRACH) may be allocated to resource types 1 and 2.

Type 1 means the IAB node may use the particular resource for the child DL BH and the child DL access.

Type 2 means the IAB node may use the particular resource for the child UL BH and child UL access.

Type 3 means that the IAB may use the particular resource flexible for the child BH and access.

Types 4 and 5 are half duplex based on SDM and/or FDM.

Resource types 4 and 5 can provide resources for IAB child link(s) in the case of FDM and SDM between the access and BH links. It should be appreciated that the parent node may dynamically allocate alternatively or additionally resource types A, B, C and/or types 1-3 for IAB nodes supporting FDM/SDM between the access and BH links.

Type 4 means the IAB node may use the particular resource for the child UL BH and child UL access, and parent DL BH.

Type 5 means the IAB node may use the particular resource for the child DL BH and the child DL access and parent UL BH.

Types 6 to 9 are full duplex resources.

Type 6 indicates that the IAB node can use DL BH for the parent, Child DL BH and Child DL access.

Type 7 means the IAB node may use the particular resource for the child UL BH, child UL access, and parent UL BH.

Type 8 means the IAB node may use the particular resource for the parent DL BH and the child BH and child access flexibly.

Type 9 means the IAB node may use the particular resource for the parent UL BH and the child BH and child access flexibly.

The IAB node may not be allowed to use resource types 1-9 for other types of link other than the associated link options. Resource types 6 to 9 may provide resources for IAB child link(s) in the case when the IAB node supports a full duplex operation between the access and BH links.

An IAB node may receive resource configuration from a parent node. This may be the case e.g. in the case of L3 architecture. Depending on the IAB architecture, RRC (for higher layer signalling to configure resource usage) resides at the donor CU, as with the IAB architecture using split gNB architecture such as shown in FIG. 5 or 6. The information about the radio resource configurations of each IAB node in the subtending IAB topology may be located in a centralized node/function. Some embodiments may be applied in that case as well. With the IAB architectures without CU/DU split, the resource allocation provided by some embodiments can be applied on hop-by-hop basis where the parent node sets the basis for availability of resources for the child node. The same principles may be repeated in a multi-hop scenario where the upstream node (i.e. parent node) has the priority for resources considering the restrictions set by the grand-parent node.

In some embodiments, a 5G network may support multi-hop wireless self-backhauling. FIG. 4 illustrates an exemplary multi-hop resource allocation for half-duplex IAB scenario with TDM between parent BH and Child links. Some embodiments may assume semi-static resource pool configuration and equal split between BH DL, BH UL, access DL and access UL slots. This example contains only up-to three hops but it can be easily extended with additional hops. It can be noted that in this example scenario (half-duplex, TDM between the access or BH) hop (k) and hop (k+2) are always serving the same link (BH DL, BH UL, access DL or access UL).

In some embodiments, the IAB node reports a duplexing capability after an initial access so that a parent node can configure the resource type combinations accordingly.

In some embodiments, all IAB nodes may support resource types A, B, C and types 1-3.

In some embodiments, IAB nodes supporting half-duplex based on FDM and/or SDM may also support resource types 4 and 5.

In some embodiments, IAB nodes capable of full duplex operation may support all resource types.

Reference is made to FIG. 9 which shows some resource type combinations available for a TDM scenario.

Type 1 is used for a DL child. This may be for a DL child access or a DL child BH.

Type 2 is used for a UL child. This may be for an UL child access or a UL child BH.

Type 3 is used for a flexible child. This may be for a flexible child access or flexible child BH. The IAB node may have full flexibility to use these resources as a DL child or UL child.

The BH and Access link may be time division multiplexed with each other. Each resource type combination may contain two sub-types: access only, and BH only. In this example type 1a can be used for the child DL BH and type 1b can be used for the child access DL.

Type 2a can be used for the child UL BH and type 2b represents the child UL BH.

Type 3a can be used flexibly (for UL or DL) for the child BH and type 3b can be used flexibly (for UL or DL) for the child access.

Reference is made to FIG. 10 which shows some resource type combinations available for a FDM/SDM scenario:

Type 4 means the IAB node will use the particular resource for the child UL BH and child UL access, and parent DL BH.

Type 4a may be used for an IAB node for a parent DL BH and a child UL BH at the same time.

Type 4b is used for an IAB node for receiving a parent DL BH and Child UL access at the same time Type 5 means the IAB node will use the particular resource for the child DL BH and the child DL access and parent UL BH.

Type 5a is used for an IAB node for a parent UL BH and a child DL BH at the same time.

Type 5b is used for an IAB node for a parent UL BH and a child DL access at the same time.

Reference is made to FIG. 11 which shows some resource type combinations available for a Resources available for full duplex scenario (IAB node transmitting and receiving at the same time)

Type 6 indicates that the IAB node can use DL BH for the parent, Child DL BH and Child DL access.

In a time multiplexed option, type 6a is used for the parent DL BH and the child DL BH. Type 6b is used for the parent DL BH and the child DL access.

Type 7 means the IAB node will use the particular resource for the child UL BH, child UL access, and parent UL BH.

In a time multiplexed option, type 7a is used for the parent UL BH and the child UL BH. Type 7b is used for the parent UL BH and the child UL access.

Type 8 means the IAB node will use the particular resource for the parent DL BH and the child BH and child access flexibly.

In a time multiplexed option, type 8a is used for the parent DL BH and flexibly for the child BH. Type 8b is used for the parent DL BH and flexibly for the child access.

Type 9 means the IAB node will use the particular resource for the parent UL BH and the child BH and child access flexibly. In a time multiplexed option, type 9a is used for the parent UL BH and flexibly for the child BH. Type 9b is used for the parent UL BH and flexibly for the child access.

Figure 12:
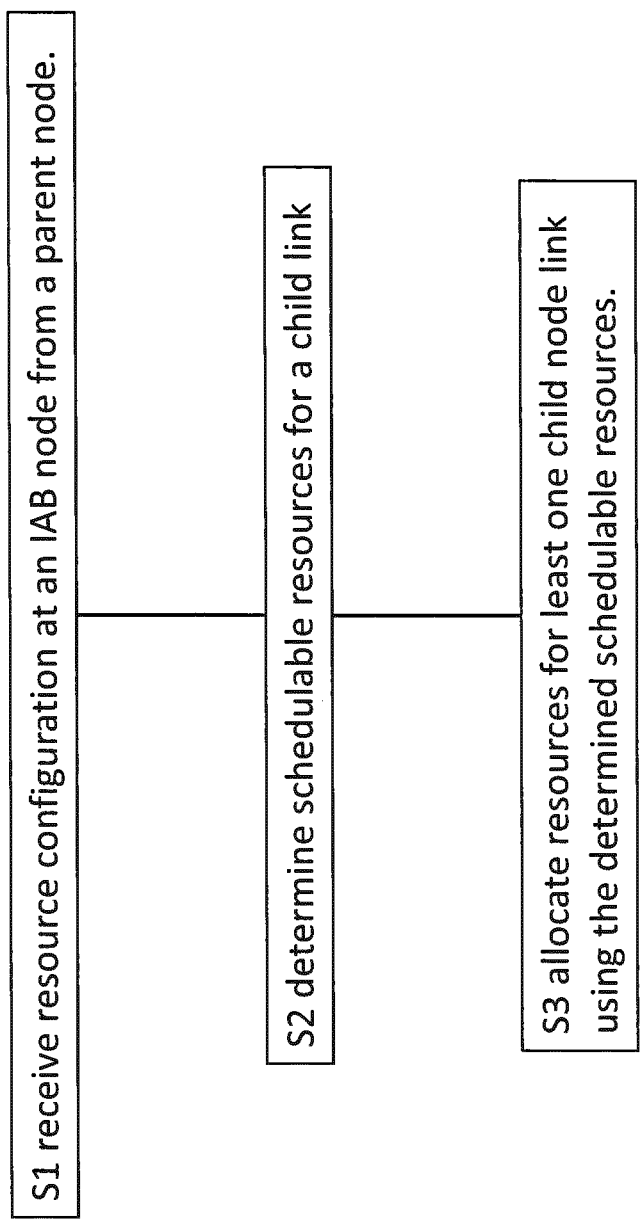
FIG. 12 shows a flowchart of a method according to some embodiments.

A method of some embodiments will now be described with reference to FIG. 12.

In step S1 a resource configuration is received at an IAB node from a parent node. The resource configuration defines a resource type combination for at least one time instant and at least one PRB. The resource type combination may contain any one or more of the resource types such as shown in FIG. 8.

In step S2, the IAB node or control apparatus in that node is configured to determine schedulable resources for a child link for at least one time instant and at least one PRB based on the received resource configuration.

In step S3, resource allocation is performed for at least one child node link using the determined schedulable resources. The child may be another IAB or a communication device.

It should be appreciated that the nomenclature of the types is by way of example only and different embodiments may have a different nomenclature.

The number of types is by way of example only and different embodiments may have different numbers of types.

Some embodiments may provide an unambiguous determination of the usage and the rules how to use radio resources at each IAB node.

Some embodiments may support various implementation options for the IAB node.

Some embodiments may be compatible with NR Rel-15. In some embodiments, a communication device or UE may be running with Rel-15 rules, and IAB nodes may be running as described in one or more of the described embodiments. Cell-common configuration may be common for access UEs and IAB nodes. Dedicated UE-specific configuration may be different for access UEs and IAB nodes. DCI 2_0 may be different for access UEs and IAB nodes Some embodiments may enable resource allocation to adapt to varying traffic and radio conditions over multiple hops of self-backhauling.

Some embodiments may be used with the so called normal slot types. Alternatively or additionally, some embodiments may be used with so-called mini-slots such as provided in NR.

Some embodiments may be applied to any IAB architecture options with either centralized or distributed control and gNB architecture.

Some embodiments may be straight forward to implement as dynamic BH and/or access adaptation is not mandatory for the network. Using current rules of current proposals, the flexible resources and the corresponding framework need to be used which in some situations may be relatively complicated.

Some embodiments may provide a robust operation for cell-common channels operating in IAB child link(s). It may be advantageous if these channels defining the cell can always be transmitted. This may contrast with current proposals where it may be that an IAB node is serving a parent BH at the time when it should transmit/receive common channels via the access link Some embodiments may provide a common framework supporting one or more different duplexing schemes. In some embodiments, all of the different duplexing schemes may be supported by the same framework.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of a 5G network, similar principles maybe applied in relation to other examples of networks. It should be noted that other embodiments may be based on other standards other than 3GPP standards. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus, comprising:
at least one processor; and
at least one memory including computer program code;
the at least one memory and the computer program code configured to, with the at least one processor, cause the apparatus at least to:
receive resource configuration from at least one of a parent node or donor node, said resource configuration comprising information defining at least one resource type for at least one backhaul link and at least one access link for at least one time and at least one resource;
receive further configuration information indicating resources of a flexible resource type, of the at least one resource type, are reserved on a link with said parent node or donor node; and
in dependence on said information defining the at least one resource type for the at least one backhaul link and the at least one access link for the at least one time and the at least one resource, and the further configuration information indicating the resources reserved on the link with said parent node or donor node, allocate one or more resources of said at least one resource type for said at least one time to at least one link of the at least one backhaul link or the at least one access link, wherein allocating one or more resources comprises at least one of:
determining that at least one time and at least one resource is not allocatable to any one of a plurality of child links that are operating according to the further configuration information,
determining that at least one time and at least one resource are allocatable to downlink child links in an instance said at least one time and at least one resource is reserved for uplink parent node backhaul, or
determining that at least one time and at least one resource are allocatable to uplink child links in an instance said at least one time and at least one resource is reserved for downlink parent node backhaul.

2. The apparatus as claimed in claim 1, wherein the at least one memory and the computer program code are further configured to cause the apparatus at least to: determine one or more schedulable resources for at least one link of the at least one backhaul link and the at least one access link for the at least one time and the at least one resource based on said received resource configuration, said allocating using said determined schedulable resources.

3. The apparatus as claimed in claim 1, wherein said at least one resource comprises at least one physical resource block.

4. The apparatus as claimed in claim 1, wherein at least one resource type is flexibly allocable to at least one link of the at least one backhaul link or the at least one access link.

5. The apparatus as claimed in claim 1, wherein the at least one backhaul link and the at least one access link comprises one or more of an uplink backhaul link with a first child node, a downlink backhaul link with said first child node, an uplink access link with a second child node and a downlink access link with a second child node.

6. The apparatus as claimed in claim 5, wherein at least one resource type defines for at least one time and at least one resource an access link with said second child node and a backhaul link with a first child node.

7. The apparatus as claimed in claim 5, wherein one or more of the following resource types is defined by said information in said resource configuration:
a first type for a downlink child access link with the second child node and the downlink backhaul link with the first child node;
a second type for an uplink child access link with the second child node and the uplink backhaul link with the first child node; and
a third, flexible, type which can be used for any link with first and second child nodes.

8. The apparatus as claimed in claim 1, wherein the at least one memory and the computer program code are further configured to cause the apparatus at least to: drop allocation of the at least one time and at least one resource to a link with said parent node and using said at least one time and at least one resource for at least one link with at least one child node.

9. The apparatus as claimed in claim 1, wherein at least one resource type is such that at least one time and at least one resource is not schedulable for a child link and is schedulable for a link with said parent node.

10. The apparatus as claimed in claim 1, wherein one or more of the following resource types is defined by said information in said resource configuration:
a first parent node link type for the downlink backhaul link with the parent node;
a second parent node link type for the uplink backhaul link with the parent node; and
a third, flexible, parent node link type which can be used for any link with the parent node and one or more child nodes.

11. The apparatus as claimed in claim 10, wherein the further configuration information indicates that the third, flexible, parent node link type is reserved for the link with said parent node.

12. The apparatus as claimed in claim 1, wherein at least one parent node link is time multiplexed with respect to at least one child link.

13. The apparatus as claimed in claim 1, wherein at least one parent node link and at least one child link are at least one of frequency division multiplexed or spatial division multiplexed with respect to one another.

14. The apparatus as claimed in claim 1, wherein the at least one resource type comprises one or more resource types for a plurality of links where at least one link is with the parent node and at least one link is with the one or more child nodes.

15. The apparatus as claimed in claim 1, wherein said at least one time comprises a plurality of time slots, said resource type being one or more of slot specific and symbol specific.

16. The apparatus as claimed in claim 1, wherein said resource configuration is provided by at least one of the following: cell-specific higher layer configuration; dedicated higher layer configuration; or group-common physical downlink control channel.

17. An apparatus, comprising:
    at least one processor; and
    at least one memory including computer program code, the at least one memory and the computer program code configured to, with the at least one processor, cause the apparatus at least to:
    cause resource configuration to be transmitted to at least one child node, said resource configuration comprising information defining at least one resource type for at least one backhaul link and at least one access link for at least one time and at least one resource; and
    cause further configuration information to be transmitted to the at least one child node, wherein the further configuration information indicates resources of a flexible resource type, of the at least one resource type, are reserved on a link with the apparatus, wherein said information defining the at least one resource type for the at least one backhaul link and the at least one access link for the at least one time and the at least one resource and the further configuration information indicating the resources reserved on the link with the apparatus, enable the at least one child node to allocate one or more resources of said at least one resource type for said at least one time to at least one link of the at least one backhaul link and the at least one access link, wherein allocating one or more resources comprises at least one of:
    determining that at least one time and at least one resource are not allocatable to any one of a plurality of child links that are operating according to the further configuration information,
    determining that at least one time and at least one resource are allocatable to downlink child links in an instance said at least one time and at least one resource are reserved for uplink parent node backhaul, or
    determining that at least one time and at least one resource are allocatable to uplink child links in an instance said at least one time and at least one resource are reserved for downlink parent node backhaul.

18. A method, comprising:
    receiving resource configuration from at least one of a parent node or donor node, said resource configuration comprising information defining at least one resource type for at least one backhaul link and at least one access link for at least one time and at least one resource;
    receiving further configuration information indicating resources of a flexible resource type, of the at least one resource type, are reserved on a link with said parent node or donor node; and
    in dependence on said information defining the at least one resource type for the at least one backhaul link and the at least one access link for the at least one time and the at least one resource and the further configuration information indicating the resources reserved on the link with said parent node or donor node, allocating one or more resources of said at least one resource type for said at least one time to at least one link of the at least one backhaul link or the at least one access link, wherein allocating one or more resources comprises at least one of:
    determining that at least one time and at least one resource is not allocatable to any one of a plurality of child links that are operating according to the further configuration information,
    determining that at least one time and at least one resource are allocatable to downlink child links in an instance said at least one time and at least one resource are reserved for uplink parent node backhaul, or
    determining that at least one time and at least one resource are allocatable to uplink child links in an instance said at least one time and at least one resource are reserved for downlink parent node backhaul.

* * * * *